June 2, 1925.　　　　R. COLOMBINO　　　1,540,103
AUTOMOBILE TOP
Filed Aug. 7, 1922　　　4 Sheets-Sheet 2
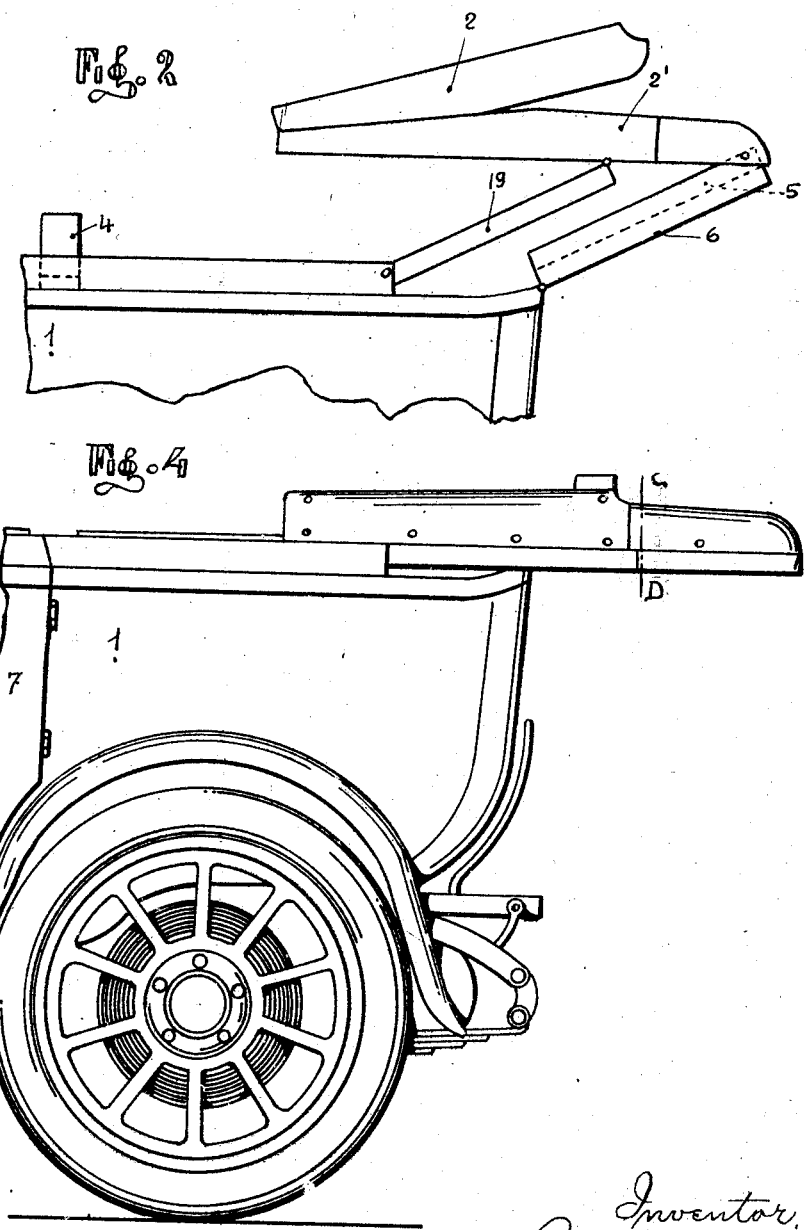

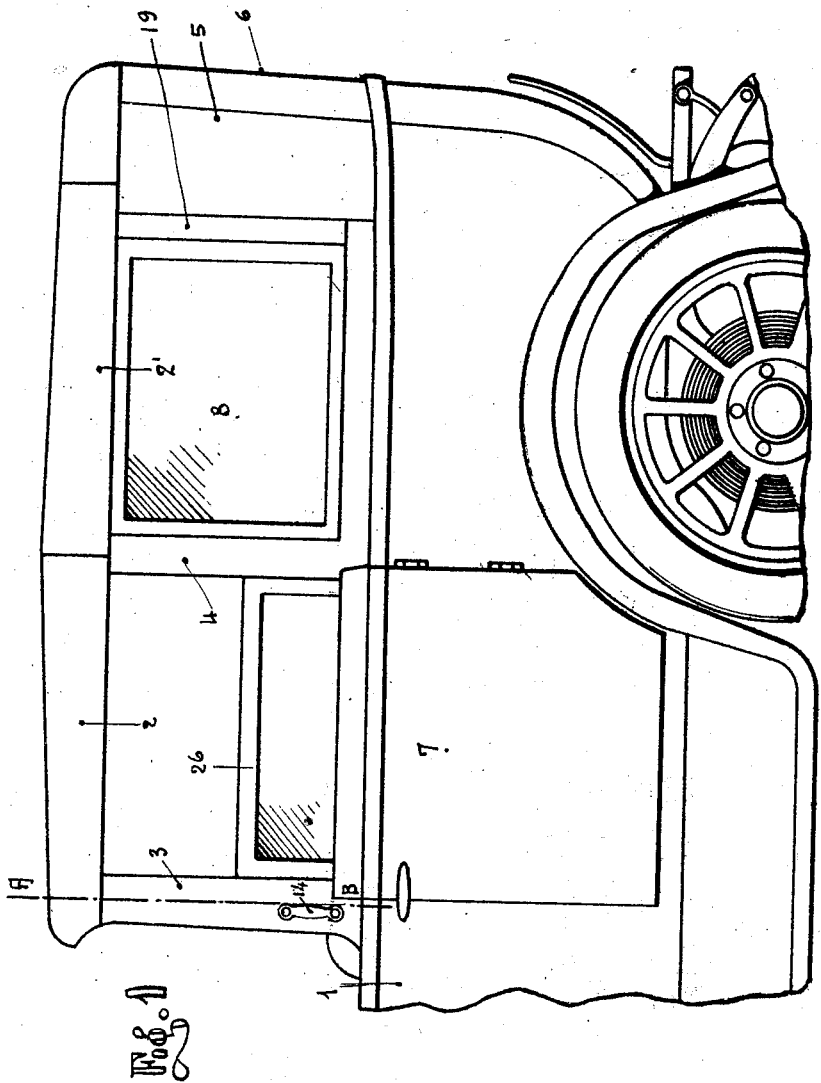

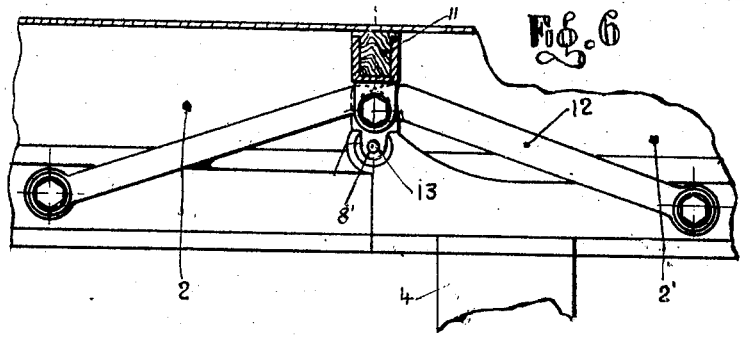
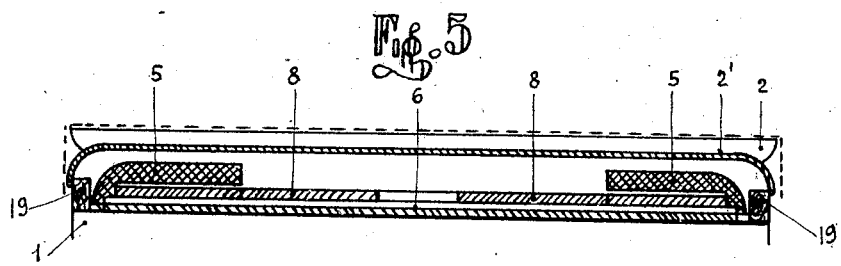
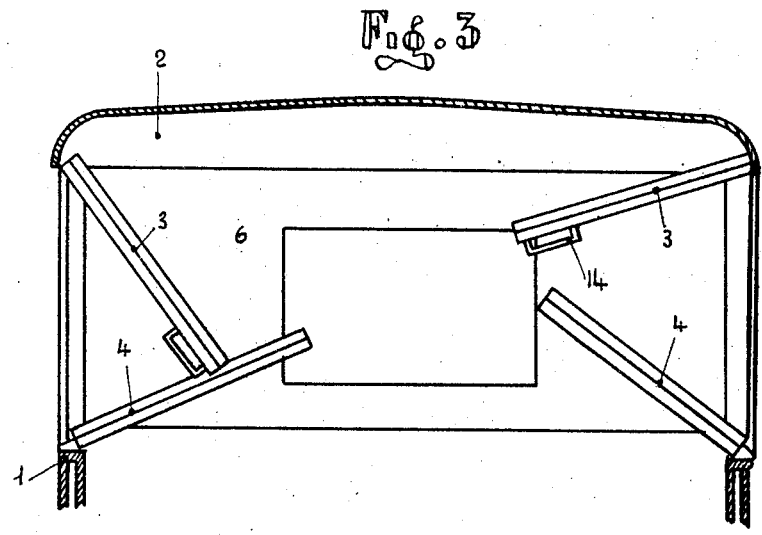

June 2, 1925.  R. COLOMBINO  1,540,103
AUTOMOBILE TOP
Filed Aug. 7, 1922  4 Sheets-Sheet 4
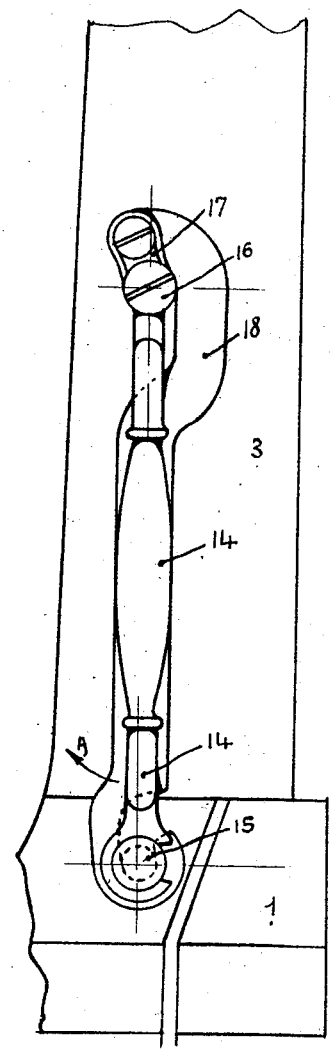
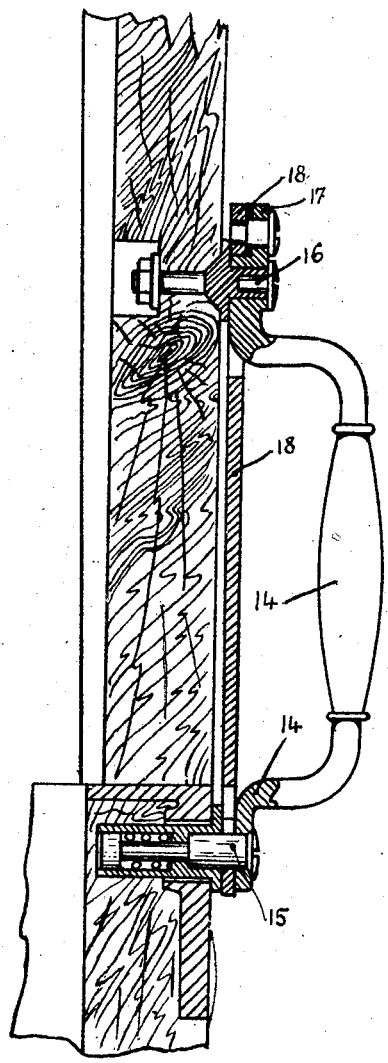

Patented June 2, 1925.

1,540,103

UNITED STATES PATENT OFFICE.

RINO COLOMBINO, OF TURIN, ITALY.

AUTOMOBILE TOP.

Application filed August 7, 1922. Serial No. 580,178.

*To all whom it may concern:*

Be it known that I, RINO COLOMBINO, a subject of the King of Italy, residing at Turin, in the Kingdom of Italy, have invented certain new and useful Improvements in Automobile Tops; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to coach or car bodies and its object is to so combine the advantages of a coach body having a dismountable roof with the advantages possessed by a car body equipped with a flexible hood while preserving at the same time the strength and water tightness and the elegant outline of a fixed roof, that, when the weather is variable, a car being used as an open vehicle may be converted into a closed one in a few minutes.

To the attainment of this object I provide a car body capable of being converted from an open one to a closed one, and vice versa, having the characteristic feature that the cover or roof is composed of rigid foldable parts which can be grouped together in a very small space at the back of the car body.

Preferably, the cover or roof consists of a frame articulated between its ends and covered or lined with leather or other flexible material and is supported by pivotable and foldable uprights. Windows for the doors are arranged to drop into the doors, the side windows of the car are arranged to slide into the side walls, and the latter arranged to turn inwards with the said windows against the rear wall which latter can be folded down until it comes approximately into a horizontal position where it forms a support on which the roof rests when folded back, the roof being guided in the operation of folding back by the rear wall and by back uprights which are pivoted in parallel.

A special handle may be employed for securing the front uprights, each handle comprising two parts, namely a handle proper and counterhandle pivoted to the car body and hook shaped at their other ends to engage a stud on the corresponding upright in such a manner that when the handle proper is turned from engagement with said stud, the counterhandle is first lowered and then moved clear of the stud also. When the car body is closed the special handle serves as a grip to enable passengers to enter easily into the car, while when the car body is open it serves as a means for holding the upright folded against the roof.

One constructional form of the invention is illustrated, by way of example, on the accompanying drawings as applied to a cabriolet.

Fig. 1 is a partial side elevation showing a closed coach body.

Fig. 2 is a view, similar to Fig. 1 showing the coach body during the operation of transformation.

Fig. 3 is a section on the line A—B of Fig. 1, showing the way in which the front uprights and those in the middle are folded up.

Fig. 4 is a partial side elevation of the coach body open.

Fig. 5 is a section on the line C—D of Fig. 4, seen from behind.

Fig. 6 is a detail of the articulation of the cover, carrying the hoop that maintains the flexible part of the cover duly stretched.

Figs. 7 and 8 show the handle for disengaging the upright in front.

In the drawings 1 shows the body of the car having a foldable roof 2, $2^1$, hinged at $8^1$ (Fig. 6) and lined or covered with leather or other flexible material.

The roof is supported by uprights 3, 4, capable of being dismounted or folded and also by uprights 19 and a rear wall 6 pivoted in parallel at their lower ends to the car body 1 and at their upper ends to the roof (see Fig. 2).

Between the rear uprights 19 and the rear wall 6 there are side walls 5 pivoted to the wall 6 and adapted to be folded inwards against the same.

The windows 26 are arranged to be lowered into the doors 7 and the windows 8 can be moved backwards in a slide formed partly in the edge of the car body 1 and partly in the side walls 5 to a position where they can be turned with the side walls 5 to lie parallel with the rear wall 6.

The operations to be performed in order to convert the closed car body (Fig. 1) into an open car body (Fig. 4) are as briefly as follows:—

1. Unhook the uprights 3 from the car body and fold them up against the roof 2 (Fig. 3).

2. Unhook the uprights 4 from the roof and fold them into the car body (or remove them).

3. Let down the windows 26.

4. Slide back the windows 8 into the side walls 5 and then fold the side walls 5 against the back wall 6.

5. Push the roof backwards, tilting the uprights 19 and the back wall 6 which will act as a parallel link connection (Fig. 2).

6. Fold the part 2 of the roof over on to the part $2^1$.

The whole roof or cover is thus gathered in behind the car body and it occupies very little space while the appearance or outline of the car body is not spoiled.

In order to maintain the roof leather stretched when the cover is up, the cover is fitted with a hoop 11, connected to the hinge $8^1$ between the parts 2, $2^1$ of the roof and supported by hinged legs 12.

The hoop 11 has an extension 13 disposed between the legs 12, so that when the cover is folded back the hoop 11 is forced to move into the position where it will be found least cumbersome.

The system of unhooking the uprights may be of any suitable type. Figs. 7 and 8 show an example of such a system that is particularly suitable for the front uprights 3.

According to that form of construction, a spring pressed stud 15 is mounted on the car body and is engaged by the lower hook shaped end of a handle 14 pivoted to the upright, at 16, and provided with an extension 17 on which a counterhandle 18 is pivoted. The latter is also hooked to the pivot 15 by means of a hook shaped as shown.

By causing the handle 14 to turn in the direction of the arrow (Fig. 7), the counter handle 18 is lowered to a position where it can be turned independently from engagement with the pivot 15. When this takes place the upright is disengaged from the car body and can then be folded up against the roof. When the car is used as a closed car this handle serves as a support and enables one to enter the vehicle more easily, whilst when the upright is unhooked and folded up against the roof the handle is adapted to be engaged by a projection (not shown) in the roof to hold the upright. The handle also serves as a catch or hold in transforming the car body from a closed to an open one and vice versa.

What I claim is:

1. A car body, comprising a rear top portion, a front top portion adapted to be folded back over the rear portion, front uprights pivotally connected at their upper ends to said front portion and foldable against the under face of the latter, means for detachably connecting the front uprights to the car body, intermediate uprights for supporting the front and rear top portions at their connection and adapted to be folded inward from the sides of the car body, a back wall and rear uprights pivotally connected in parallel relation to the car body at their lower ends and to the rear top portion at their upper ends, side walls pivotally connected to said back wall and adapted to be folded against the latter, and windows slidable horizontally in said side walls towards and from the intermediate uprights.

2. A car body having a foldable top comprising a rear frame, a front frame hinged to and adapted to be folded over the rear frame, a flexible covering supported by the said front and rear frames, means adapted to maintain the flexible covering stretched when the latter is extended, front uprights connected at their upper ends to said front frame and foldable against the under face of the latter, means for detachably connecting the front uprights to the car body, intermediate uprights for supporting the front and rear frames at their connection and adapted to be folded inwardly against the side of the car body, a back wall and rear uprights pivotally connected in parallel relation to the car body at their lower ends and to the said rear frame at their upper ends, side walls pivotally connected to said back wall and adapted to be folded against the latter, and windows slidable horizontally in said side walls towards and from the intermediate uprights.

3. A car body having a foldable top comprising a rear frame, a front frame hinged to and adapted to be folded over the said rear frame, a flexible covering supported by the front and rear frames, arms pivoted to the front and rear frames for maintaining the flexible covering extended when the foldable top is in use, a hoop pivoted to said arms, an extension on the hoop, a pin projecting laterally from the extension between said arms, front uprights pivotally connected at their upper ends to said front frame and foldable against the under face of the latter, means for detachably connecting the front uprights to the car body, intermediate uprights for supporting the front and rear frames at their connection and adapted to be folded inwardly against the side of the car body, a back wall and rear uprights pivotally connected in parallel relation to the car body at their lower ends and to the said rear frame at their upper ends side walls pivotally connected to said back wall and adapted to be folded against the latter, and windows slidable horizontally in said side walls towards and from the intermediate uprights.

4. A car body comprising a rear top portion, a front top portion adapted to be folded back over the rear portion, front uprights pivotally connected at their upper ends to said front portion and foldable against the lower face of the latter, means for detachably connecting the front uprights to the car body comprising a spring pressed stud on the car body, a handle pivoted to the uprights and having its lower end hook shaped for engaging the said stud, an extension on the said handle, a counter handle pivotally connected at one end to the said extension and having the opposite end hooked for engaging the said stud, intermediate uprights for supporting the front and rear frames at their connection and adapted to be folded inwardly against the side of the car body, a back wall and rear uprights pivotally connected in parallel relation to the car body at their lower ends and to the said rear frame at their upper ends, side walls pivotally connected to said back wall and adapted to be folded against the latter, and windows slidable horizontally in said side walls towards and from the intermediate uprights.

In testimony that I claim the foregoing as my invention, I have signed my name.

RINO COLOMBINO.